(12) United States Patent
Kamatani

(10) Patent No.: US 10,919,516 B2
(45) Date of Patent: Feb. 16, 2021

(54) HYBRID VEHICLE

(71) Applicant: Toyota Jidosha Kabushiki Kaisha, Toyota (JP)

(72) Inventor: Hideki Kamatani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 249 days.

(21) Appl. No.: 16/214,514

(22) Filed: Dec. 10, 2018

(65) Prior Publication Data

US 2019/0184965 A1 Jun. 20, 2019

(30) Foreign Application Priority Data

Dec. 20, 2017 (JP) .............................. JP2017-243348

(51) Int. Cl.
| | |
|---|---|
| *B60W 20/00* | (2016.01) |
| *B60W 10/06* | (2006.01) |
| *B60W 10/08* | (2006.01) |
| *B60W 10/101* | (2012.01) |
| *B60K 6/543* | (2007.10) |
| *B60K 6/365* | (2007.10) |

(52) U.S. Cl.
CPC ............. *B60W 20/00* (2013.01); *B60K 6/365* (2013.01); *B60K 6/543* (2013.01); *B60W 10/06* (2013.01); *B60W 10/08* (2013.01); *B60W 10/101* (2013.01); *B60W 2710/0644* (2013.01); *B60W 2710/08* (2013.01); *B60W 2710/10* (2013.01); *B60Y 2200/92* (2013.01); *B60Y 2300/91* (2013.01)

(58) Field of Classification Search
CPC ..................................................... B60W 20/00
See application file for complete search history.

(56) References Cited

U.S. PATENT DOCUMENTS

| | | | |
|---|---|---|---|
| 2013/0066494 A1* | 3/2013 | Kamijo ................. | B60W 30/20 701/22 |
| 2016/0304081 A1* | 10/2016 | Tsuchida ............... | B60W 10/08 |
| 2017/0217423 A1* | 8/2017 | Aoki ....................... | B60L 58/24 |
| 2019/0161070 A1* | 5/2019 | Kamatani ............. | B60W 20/15 |

FOREIGN PATENT DOCUMENTS

| | | |
|---|---|---|
| JP | 2015101120 A | 6/2015 |
| JP | 2015120427 A | 7/2015 |

* cited by examiner

*Primary Examiner* — Peter D Nolan
*Assistant Examiner* — Demetra R Smith-Stewart
(74) *Attorney, Agent, or Firm* — Dinsmore & Shohl LLP

(57) ABSTRACT

When the state of charge of a power storage device is equal to or higher than a predetermined ratio in a specific acceleration time where an acceleration request is equal to or greater than a predetermined level, a hybrid vehicle controls an engine such that the rotation speed of the engine is not increased in a range of an output limit of the power storage device and that the engine is operated at an operation point on a fuel consumption priority operation line. When the state of charge of the power storage device is lower than the predetermined ratio in the specific acceleration time, the hybrid vehicle controls the engine such that the rotation speed of the engine is not increased in the range of the output limit of the power storage device and that the engine is operated at an operation point on a power priority operation line.

7 Claims, 6 Drawing Sheets

HYBRID VEHICLE

CROSS-REFERENCE TO RELATED APPLICATION

This application claims priority to Japanese Patent Application No. 2017-243348 filed on Dec. 20, 2017, the contents of which is incorporated herein by reference.

TECHNICAL FIELD

The present disclosure relates to a hybrid vehicle.

BACKGROUND

A proposed hybrid vehicle is equipped with an engine, a motor and a continuously variable transmission and is configured to perform acceleration feeling directing control (rotation speed increase control), in response to the user's acceleration request, so as to increase an engine rotation speed with at least one of an increase in vehicle speed and elapse of time since the acceleration request (as described in, for example, JP 2015-120427A). In this hybrid vehicle, an excess or a deficiency of an engine output caused by the acceleration feeling directing control is corrected with a motor output. When there is no limitation in driving of the motor at start of the acceleration feeling directing control, an initial value of the engine rotation speed is set to an initial base value. When there is a limitation in driving of the motor, on the other hand, the initial value of the engine rotation speed is set to a larger value than the initial base value by a predetermined value.

CITATION LIST

Patent Literature

PTL 1: JP2015-120427A

SUMMARY

In the hybrid vehicle described above, however, when a battery has a low state of charge, only a low power is dischargeable from the battery. In this case, the motor output may fail to correct the excess or the deficiency of the engine output. A possible measure may set the initial value of the engine rotation speed to a larger value than the initial base value by the predetermined value. Since the motor output is not promising, this measure fails to meet the user's acceleration request.

A hybrid vehicle of the present disclosure mainly aims to be driven with a required power, while providing a driver the good acceleration feeling with taking into account fuel consumption, in response to the driver's acceleration request.

In order to achieve the above primary object, the hybrid vehicle of the disclosure is implemented by an aspect described below.

The present disclosure is directed to a hybrid vehicle. The hybrid vehicle includes an engine, a continuously variable transmission connected with an output shaft of the engine and with a driveshaft that is coupled with an axle, a motor configured to input and output power for driving, a power storage device configured to transmit electric power to and from the motor, and a control device configured to control the engine, the continuously variable transmission and the motor, such that the hybrid vehicle is driven with a required power that is required for driving with suppressing a rotation speed of the engine within a range of an output limit of the power storage device, in a specific acceleration time where an acceleration request is equal to or greater than a predetermined level. When a state of charge of the power storage device is equal to or higher than a predetermined ratio in the specific acceleration time, the control device controls the engine and the continuously variable transmission, such that the rotation speed of the engine is not increased in the range of the output limit of the power storage device and that the engine is operated at an operation point on a fuel consumption priority operation line that is determined in advance as an operation line giving priority to fuel consumption of the engine, and controls the motor, such that the hybrid vehicle is driven with the required power, and when the state of charge of the power storage device is lower than the predetermined ratio in the specific acceleration time, the control device controls the engine and the continuously variable transmission, such that the rotation speed of the engine is not increased in the range of the output limit of the power storage device and that the engine is operated at an operation point on a power priority operation line that is determined in advance as an operation line outputting a higher power at an identical rotation speed compared with the fuel consumption priority operation line, and controls the motor, such that the hybrid vehicle is driven with the required power.

The hybrid vehicle of this aspect is equipped with the engine, the continuously variable transmission connected with the output shaft of the engine and with the driveshaft that is coupled with the axle, the motor configured to input and output power for driving, and the power storage device configured to transmit electric power to and from the motor. In the specific acceleration time where the driver's acceleration request is equal to or greater than the predetermined level, the hybrid vehicle of this aspect controls the engine, the continuously variable transmission and the motor, such that the hybrid vehicle is driven with the required power that is required for driving, while suppressing the rotation speed of the engine within the range of the output limit of the power storage device. This causes the rotation speed of the engine to gradually increase with elapse of time and thereby provides the driver the comfortable acceleration feeling. When the state of charge of the power storage device is equal to or higher than the predetermined ratio in the specific acceleration time, the hybrid vehicle of this aspect controls the engine and the continuously variable transmission, such that the rotation speed of the engine is not increased in the range of the output limit of the power storage device and that the engine is operated at an operation point on the fuel consumption priority operation line that is determined in advance as the operation line giving priority to fuel consumption of the engine, and controls the motor, such that the hybrid vehicle is driven with the required power. This enables the hybrid vehicle to be driven with the required power, while providing the driver the good acceleration feeling with maintaining the good fuel consumption. When the state of charge of the power storage device is lower than the predetermined ratio in the specific acceleration time, on the other hand, the hybrid vehicle of this aspect controls the engine and the continuously variable transmission, such that the rotation speed of the engine is not increased in the range of the output limit of the power storage device and that the engine is operated at an operation point on the power priority operation line that is determined in advance as the operation line outputting the higher power at the identical rotation speed compared with the fuel consumption priority operation line, and controls the motor, such that the hybrid vehicle is driven with the required power. This slightly lowers the fuel consumption but enables the hybrid vehicle to be driven with the required power, while providing the driver the good acceleration feeling. As a result, this configuration enables the hybrid vehicle to be driven with the required power, while providing the driver the good acceleration feeling with taking into account the fuel consumption, in response to the driver's acceleration request.

DESCRIPTION OF EMBODIMENTS

The following describes some aspects of the present disclosure with reference to an embodiment.

Figure 1:
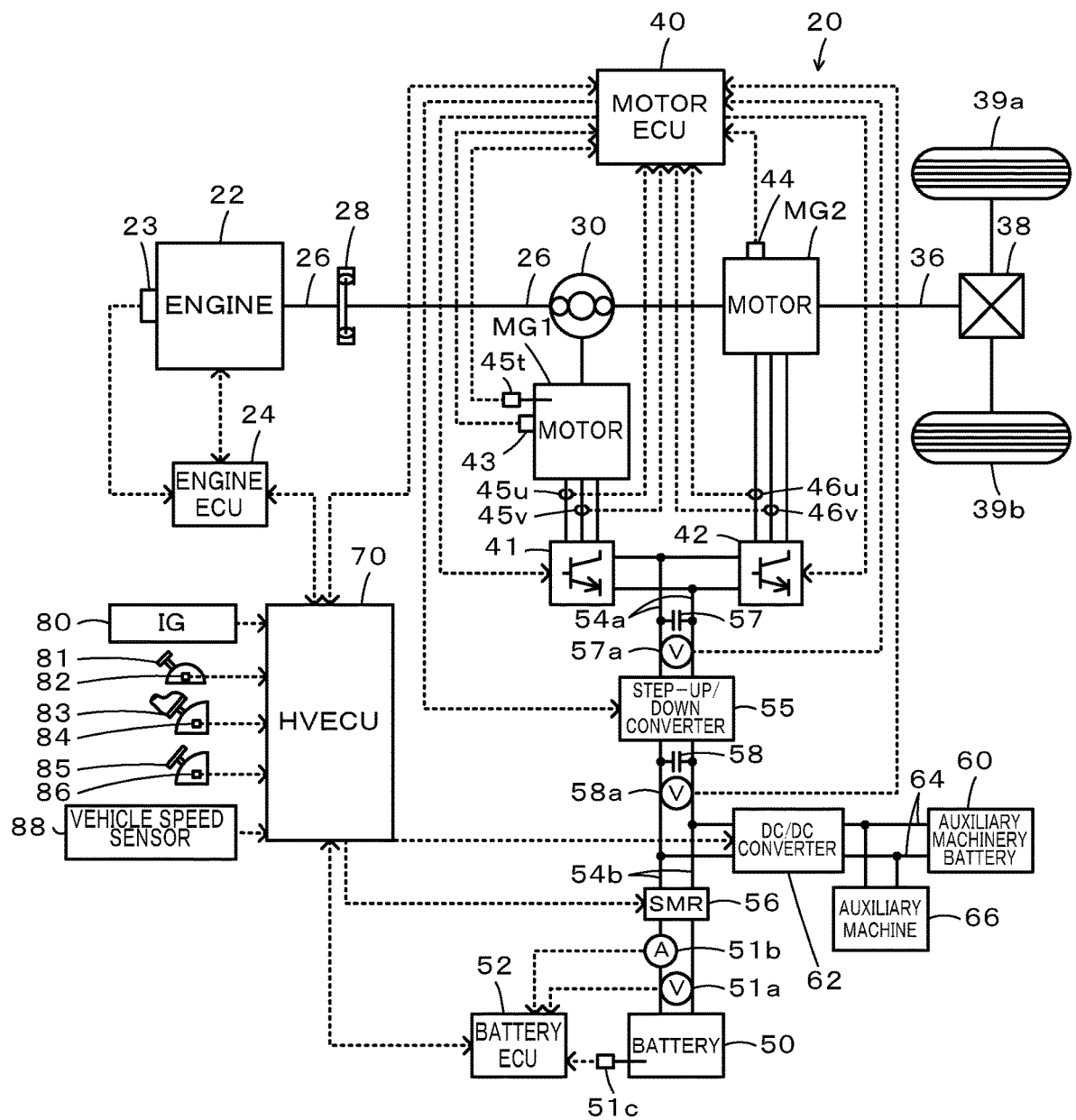
FIG. 1 is a configuration diagram illustrating the schematic configuration of a hybrid vehicle according to one embodiment of the present disclosure.

FIG. 1 is a configuration diagram illustrating the schematic configuration of a hybrid vehicle 20 according to one embodiment of the present disclosure. As illustrated, the hybrid vehicle 20 of the embodiment includes an engine 22, a planetary gear 30, motors MG1 and MG2, inverters 41 and 42, a step-up/down converter 55, a battery 50 as a power storage device, a system main relay 56, an auxiliary machinery battery 60, and a hybrid electronic control unit (hereinafter referred to as "HVECU") 70.

The engine 22 is configured as an internal combustion engine to output power using, for example, gasoline or light oil as a fuel. The engine 22 is operated and controlled by an engine electronic control unit (hereinafter referred to as "engine ECU") 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22, for example, a crank angle θcr from a crank position sensor 23 configured to detect the rotational position of a crankshaft 26 of the engine 22, are input into the engine ECU 24 via the input port. Various control signals for operation control of the engine 22 are output from the engine ECU 24 via the output port. The engine ECU 24 is connected with the HVECU 70 via the respective communication ports. The engine ECU 24 calculates a rotation speed Ne of the engine 22, based on the crank angle θcr from the crank position sensor 23.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 39a and 39b via a differential gear 38. The planetary gear 30 further includes a carrier that is connected with the crankshaft 26 of the engine 22 via the damper 28 as described above.

The motor MG1 is configured as a synchronous generator motor including a rotor with permanent magnets embedded therein and a stator with three-phase coils wound thereon. The rotor of this motor MG1 is connected with the sun gear of the planetary gear 30 as described above. The motor MG2 is also configured as a synchronous generator motor like the motor MG1. A rotor of this motor MG2 is connected with the driveshaft 36.

The inverter 41 is connected with high voltage-side power lines 54a and is configured as a known inverter circuit including six transistors and six diodes. Like the inverter 41, the inverter 42 is also connected with the high voltage-side power lines 54a and is configured as a known inverter circuit including six transistors and six diodes. A motor electronic control unit (hereinafter referred to as "motor ECU") 40 regulates the rates of ON times of respective pairs of the transistors included in the inverters 41 and 42 under application of a voltage. The inverters 41 and 42 accordingly generate rotating magnetic fields in the three-phase coils of the motors MG1 and MG2, so as to rotate and drive the motors MG1 and MG2.

The step-up/down converter 55 is connected with the high voltage-side power lines 54a and with low voltage-side power lines 54b and is configured as a known step-up/down converter circuit including a reactor and two transistors and two diodes forming an upper arm and a lower arm. The motor ECU 40 regulates the rates of ON times of the two transistors forming the upper arm and the lower arm in the step-up/down converter 55. The step-up/down converter 55 accordingly steps up the voltage of an electric power of the low voltage-side power lines 54b and supplies the electric power of the stepped-up voltage to the high voltage-side power lines 54a, while stepping down the voltage of an electric power of the high voltage-side power lines 54a and supplying the electric power of the stepped-down voltage to the low voltage-side power lines 54b. A capacitor 57 for smoothing is mounted to a positive electrode line and a negative electrode line of the high voltage-side power lines 54a. A capacitor 58 for smoothing is mounted to a positive electrode line and a negative electrode line of the low voltage-side power lines 54b.

The motor ECU 40 is configured as a CPU-based microprocessor and includes a ROM configured to store processing programs, a RAM configured to temporarily store data, input/output ports, and a communication port, in addition to the CPU, although not being illustrated. Signals from various sensors required for drive control of the motors MG1 and MG2 and the step-up/down converter 55 are input into the motor ECU 40 via the input port. The signals input into the motor ECU 40 include, for example, rotational positions θm1 and θm2 from rotational position detection sensors 43 and 44 configured to detect the rotational positions of the respective rotors of the motors MG1 and MG2, phase currents Iu1, Iv1, Iu2 and Iv2 from current sensors 45u, 45v, 46u and 46v configured to detect electric currents flowing in the respective phases of the motors MG1 and MG2, and a motor temperature tm1 from a temperature sensor 45t mounted to the motor MG1. The input signals also include a voltage VH of the capacitor 57 (high voltage-side power lines 54a) from a voltage sensor 57a mounted between terminals of the capacitor 57 and a voltage VL of the capacitor 58 (low voltage-side power lines 54b) from a voltage sensor 58a mounted between terminals of the capacitor 58. Various control signals for drive control of the motors MG1 and MG2 and the step-up/down converter 55 are output from the motor ECU 40 via the output port. The signals output from the motor ECU 40 include, for example, switching control signals to the transistors of the inverters 41 and 42 and switching control signals to the transistors of the step-up/down converter 55. The motor ECU 40 is connected, with the HVECU 70 via the respective communication ports. The motor ECO 40 calculates electrical angles θe1 and θe2 and rotation speeds Nm1 and Nm2 of the respective motors MG1 and MG2, based on the rotational positions θm1 and θm2 of the respective rotors of the motors MG1 and MG2 input from the rotational position detection sensors 43 and 44.

The battery 50 is configured by, for example, a lithium ion rechargeable battery or a nickel metal hydride battery and is connected with the low voltage-side power lines 54b. This battery 59 is under management of a battery electronic control unit (hereinafter referred to as "battery ECU") 52.

The battery ECU 52 is configured as a CPU-based microprocessor and includes a ROM configured to store processing programs, a RAM configured to temporarily store data input/output ports, and a communication port, in addition to the CPU, although not being illustrated. Signals from various sensors required for management of the battery 50 are input into the battery ECU 52 via the input port. The signals input into the battery ECU 52 include, for example, a voltage Vb of the battery 50 from a voltage sensor 51a placed between terminals of the battery 50, an electric current Ib of the battery 50 from a current sensor 51b mounted to an output terminal of the battery 50, and a temperature Tb of the battery 50 from a temperature sensor 51c mounted to the battery 50. The battery ECU 52 is connected with the HVECU 70 via the respective communication ports. The battery ECU 52 calculates a state of charge SOC, based on an integrated value of the electric current Ib of the battery 50 input from the current sensor 51b. The state of charge SOC denotes a ratio of the capacity of electric power dischargeable from the battery 50 to the overall capacity of the battery 50. The battery ECU 52 also calculates an output limit Wout and an input limit Win of the battery 50, based on the temperature Tb of the battery 50 input from the temperature sensor 51c and the calculated state of charge SOC. The output limit Wout denotes an allowable maximum power (electric power of positive value) that is dischargeable from the battery 50. The input limit Win denotes an allowable maximum power (electric power of negative value) that is usable to charge the battery 50.

The system main relay 56 is provided on the battery 50-side of the capacitor 58 in the low voltage-side power lines 54b. This system main relay 56 is controlled on and off by the HVECU 70 to connect and disconnect the battery 50 with and from the step-up/down converter 55-side.

The auxiliary machinery battery 60 is configured by a storage battery having a lower voltage than that of the battery 50, for example, a lead acid storage battery, and is connected with auxiliary machinery power lines 64. The auxiliary machinery power lines 64 are connected with the low voltage-side power lines 54b via a DC/DC converter 62.

The DC/DC converter 62 serves to convert an electric power on the low voltage-side power lines 54b into an electric power of a low voltage and supply the electric power of the low voltage to the auxiliary machinery power lines 64. Auxiliary machines 66 such as a steering device are connected with the auxiliary machinery power lines 64.

The HVECU 70 is configured as a CPU-based microprocessor and includes a ROM configured to store processing programs, a RAM configured to temporarily store data, input/output ports and a communication port, in addition to the CPU, although not being illustrated. Signals from various sensors are input into the HVECU 70 via the input port. The signals input into the HVECU 70 include, for example, an ignition signal from an ignition switch 80 and a shift position SP from a shift position sensor 82 configured to detect an operating position of a shift lever 81. The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. The HVECU 70 outputs, for example, a drive control signal to the system main relay 56 and a drive control signal to the DC/DC converter 62 via the output port. The HVECU 70 is connected with the engine ECU 24, the motor ECU 40 and the battery ECU 52 via the respective communication ports as described above.

The hybrid vehicle 20 of the embodiment having the above configuration may be driven, for example, in a hybrid drive mode (HV drive mode) or in a motor drive motor (EV drive mode). The HV drive mode denotes a mode in which the hybrid vehicle 20 is driven with operation of the engine 22 and driving of the motors MG1 and MG2. The EV drive mode denotes a mode in which the hybrid vehicle 20 is driven with stop of operation of the engine 22 and driving of the motor MG2.

In the EV drive mode, the hybrid vehicle 20 is basically driven as described below. The HVECU 70 first sets a required torque Td* that is required for driving, based on the accelerator position Acc and the vehicle speed V. The HVECU 70 subsequently sets a torque command Tm1* of the motor MG1 to a value 0 and sets a torque command Tm2* of the motor MG2 such that the required torque Td* is output to the drive wheels 39a and 39b in an allowable drive range of the motor MG2. The HVECU 70 also sets a target voltage VH* that is a target value of the voltage VH of the high voltage-side power lines 54a, such that the motors MG1 and MG2 are driven efficiently with the torque commands Tm1* and Tm2/*. The HVECU 70 then sends the set torque commands Tm1* and Tm2* of the motors MG1 and MG2 and the set target voltage VH* to the motor ECU 40. The motor ECU 40 performs switching control of the plurality of transistors included in the respective inverters 41 and 42, such that the motors MG1 and MG2 are driven with the torque commands Tm1* and Tm2*, while performing switching control of the transistors included in the step-up/down converter 55, such that the voltage VH of the high voltage-side power lines 54a becomes equal to the target voltage VH*.

In the HV drive mode, the hybrid vehicle 20 is basically driven as described below. The HVECU 70 first sets the required torque Td* that is required for driving, based on the accelerator position Acc and the vehicle speed V and sets a required power Pd* that is required for driving, based on the set required torque Td* and the vehicle speed V. The HVECU 70 subsequently sets a charge-discharge required power Pb* (which takes a positive value when the battery 50 is discharged) by adding, for example, a power Psoc that is required to make the state of charge SOC of the battery 50 approach a target state of charge SOC*, to an electric power Ph required for auxiliary machines (auxiliary machinery power Ph). The HVECU 70 then calculates a required power Pe* that is required for the vehicle (i.e., required for the engine 22) by subtracting a product of the charge-discharge required power Pb* and an efficiency η from the required power Pd* and adding a power Pac required for air conditioning. After setting the required power Pe*, the HVECU 70 sets a target rotation speed Ne* and a target torque Te* of the engine 22, the torque commands Tm1* and Tm2* of the motors MG1 and MG2, and the target voltage VH* of the high voltage-side power lines 54a, such that the required power Pe* is output from the engine 22 and the required torque Td* is output to the drive wheels 39a and 39b within allowable drive ranges of the engine 22 and the motors MG1 and MG2. The target rotation speed Ne* and the target torque Te* of the engine 22 are respectively set by applying the required power Pe* to a fuel consumption priority operation line that gives priority to efficient operation of the engine 22 or to a power priority operation line that gives priority to power, according to the situation. The torque command Tm1* of the motor MG1 is set to a value calculated by rotation speed feedback control that is performed to rotate the engine 22 at the target rotation speed Ne*. The torque command Tm1* of the motor MG1 is a torque in a direction of suppressing the rotation speed Ne of the engine 22. When the rotation speed Nm1 of the motor MG1 is a positive value (i.e., when the motor MG1 is rotated in the same direction as that of the engine 22), the motor MG1 is subjected to regenerative drive (i.e., serves as a generator). The torque command Tm2* of the motor MG2 is set to a value (Td*−Ted) obtained by subtracting a directly transmitted torque Ted of the engine 22 from the required torque Td*. The directly transmitted torque Ted of the engine 22 denotes a torque that is output from the engine 22 to the driveshaft 36 via the planetary gear 30 accompanied with output of a torque from the motor MG1 in the direction of suppressing the rotation speed Ne of the engine 22. The HVECU 70 then sends the target rotation speed Ne* and the target torque Te* of the engine 22 to the engine ECU 24, while sending the torque commands Tm1* and Tm2* of the motors MG1 and MG2 and the target voltage VH* to the motor ECU 40. The engine ECU 24 performs, for example, intake air flow control, fuel injection control and ignition control of the engine 22, such that the engine 22 is operated with the target rotation speed Ne* and the target torque Te*. The motor ECU 40 performs switching control of the plurality of transistors included in the respective inverters 41 and 42, such that the motors MG1 and MG2 are driven with the torque commands Tm1* and Tm2*, while performing switching control of the transistors included in the step-up/down converter 55, such that the voltage VH of the high voltage-side power lines 54a becomes equal to the target voltage VH*.

Figure 2:
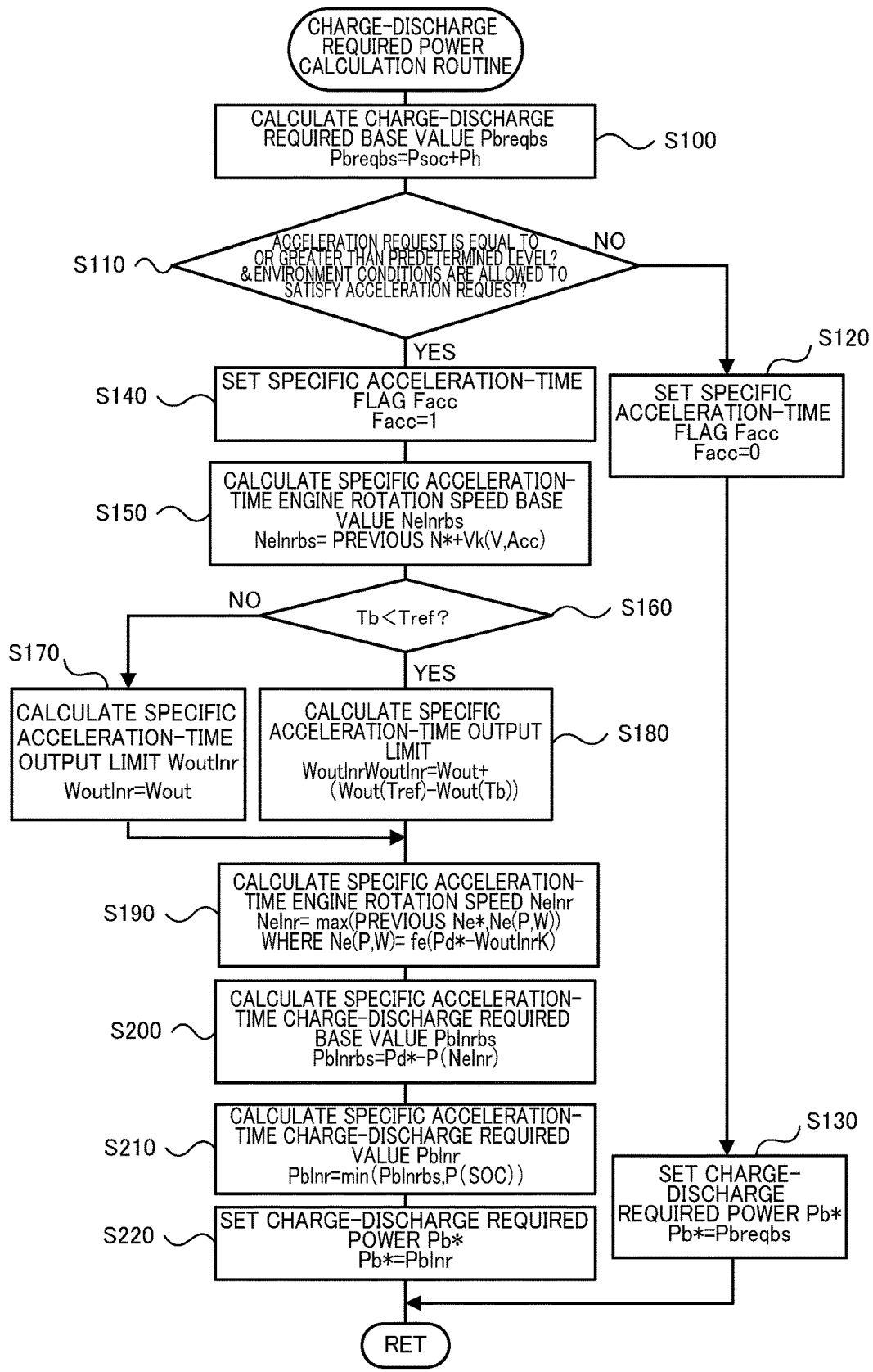
FIG. 2 is a flowchart showing one example of a charge-discharge required power calculation routine performed by an HVECU.
Figure 3:
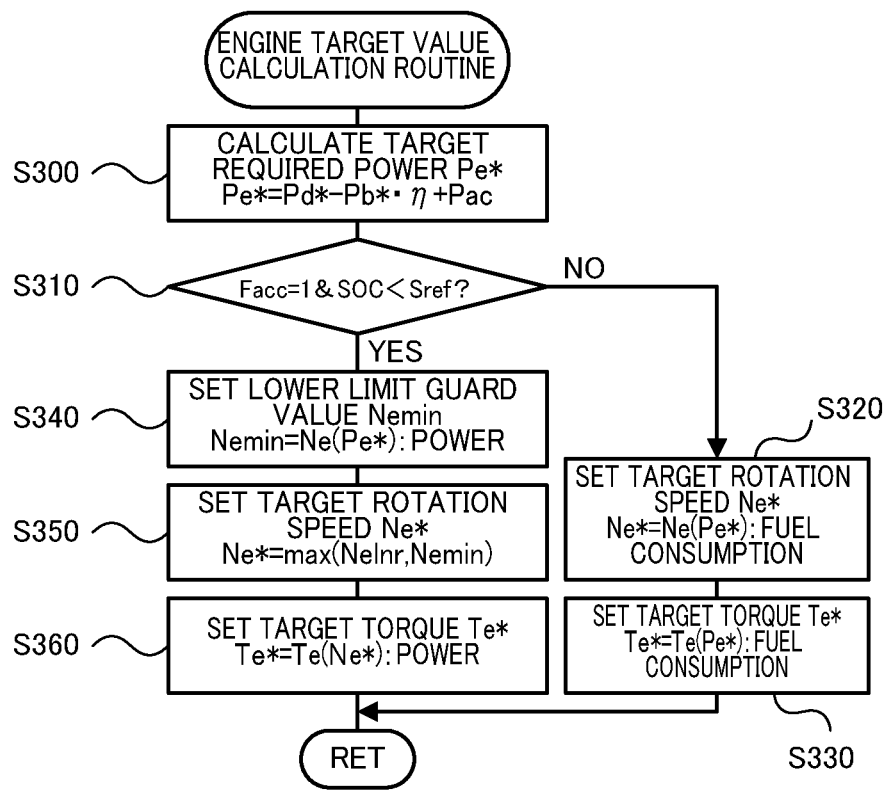
FIG. 3 is a flowchart showing one example of an engine target value calculation routine performed by the HVECU.

The following describes the operations of the hybrid vehicle 20 of the embodiment having the configuration described above or more specifically a series of operations when the driver presses down the accelerator pedal 83. FIG. 2 is a flowchart showing one example of a charge-discharge required power calculation routine performed by the HVECU 70. FIG. 3 is a flowchart showing one example of an engine target value calculation routine performed by the HVECU 70. The following first describes a process of calculating the charge-discharge required power Pb* by referring to the charge-discharge required power calculation routine of FIG. 2 and then describes a process of calculating the target rotation speed Ne* by referring to the engine target value calculation routine of FIG. 3.

Figure 4:
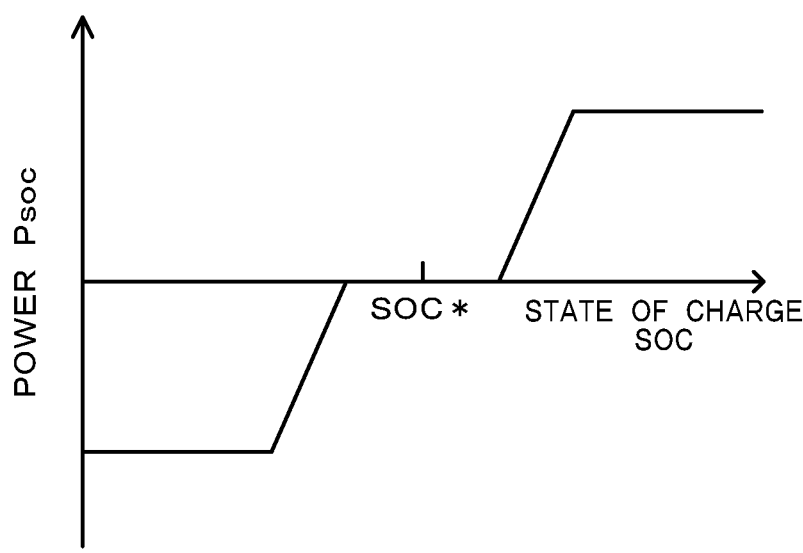
FIG. 4 is a diagram illustrating one example of a power setting map.

When the charge-discharge required power calculation routine is triggered, the HVECU 70 first sets a charge-discharge required base value Pbreqbs by using, for example, the auxiliary machinery power Ph and the power Psoc required to make the state of charge SOC of the battery 50 approach the target state of charge SOC* (step S100). The power Psoc is obtained by setting a discharge power (power of a positive value) when the state of charge SOC is higher than the target state of charge SOC* and by setting a charge power (power of a negative value) when the state of charge SOC is lower than the target state of charge SOC*. One exemplary procedure of obtaining the power Psoc may determine and store in advance a relationship between the state of charge SOC and the power Psoc as a power setting map and may read the power Psoc corresponding to a given state of charge SOC from the map. One example of the power setting map is shown in FIG. 4. The auxiliary machinery power Ph used may be, for example, actual power consumption of the auxiliary machines used at the moment, an estimated value of power consumption of the auxiliary machines or a predetermined power as the auxiliary machine power.

The HVECU 70 subsequently determines whether the driver's acceleration request is equal to or greater than a predetermined level and whether the state of the vehicle (environment conditions) is allowed to satisfy the driver's acceleration request (step S110). The determination of whether the driver's acceleration request is equal to or greater than the predetermined level may be based on determination of whether the accelerator position Acc is equal to or greater than a reference value and whether the required Power Pd* is equal to or greater than a reference value. The determination of whether the state of the vehicle (environment conditions) is allowed to satisfy the driver's acceleration request may be based on, for example, determination of whether the output limit Wout of the battery 50 is equal to or higher than a reference value, whether the temperature Tb of the battery 50 is equal to or higher than a reference value and whether an output correction of the engine 22 that is made in response to a requirement such as a high altitude drive is within a predetermined range.

When it is determined that the driver's acceleration request is less than the predetermined level or when it is determined that the state of the vehicle (environment conditions) is not allowed to satisfy the driver's acceleration request at step S110, the HVECU 70 seta a specific acceleration-time flag Facc to a value 0 (step S120), subsequently sets the charge-discharge required base value Pbreqbs set at step S100 to the charge-discharge required power Pb* (step S130) and then terminates this routine. The specific acceleration-time flag Facc is set to a value 1 representing a specific acceleration time when it is determined that the driver's acceleration request is equal to or greater than the predetermined level and that the state of vehicle (environment conditions) is allowed to satisfy the driver's acceleration request, while being otherwise set to a value 0 representing a non-specific acceleration time, by this routine. The specific acceleration-time flag Facc is used in the process of setting the target rotation speed Ne* of the engine 22.

Figure 5:
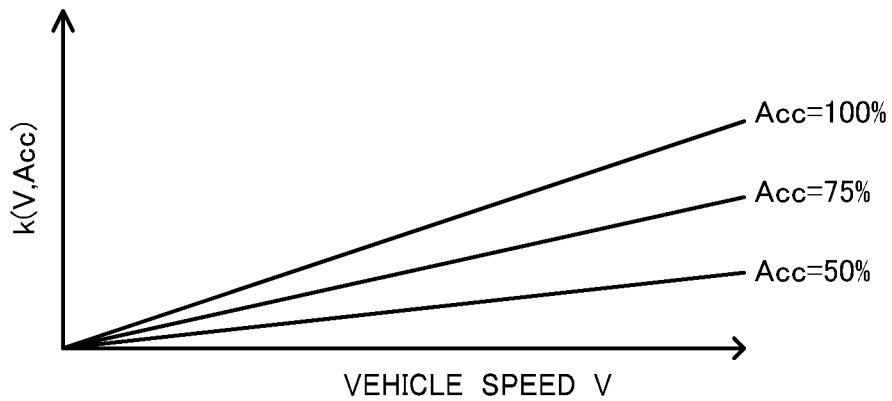
FIG. 5 is a diagram illustrating one example of a factor setting map.

When it is determined at step S110 that the driver's acceleration request is equal to or greater than the predetermined level and that the state of vehicle (environment conditions) is allowed to satisfy the driver's acceleration request, on the other hand, the HVECU 70 sets the specific acceleration-time flag Facc to the value 1 (step S140). The HVECU 70 subsequently calculates a specific acceleration-time engine rotation speed base value Nelnrbs (step S150). The specific acceleration-time engine rotation speed base value Nelnrbs is a sum of the target rotation speed Ne* of the engine 22 set in a previous cycle of this routine (previous Ne*) and a product of a differential speed $\Delta V$(=V−previous V) between the current vehicle speed V and the vehicle speed V in the previous cycle of this routine (previous V*) and a factor k(V,Acc). The factor k(V,Acc) is an adaptive value that depends on the vehicle speed V and the accelerator position Acc and indicates the degree of increasing the rotation speed Ne of the engine 22 with an increase in the vehicle speed V. The factor k(V,Acc) may be determined with such a tendency to increase with an increase in the vehicle speed V and to increase with an increase in the accelerator position Acc. One exemplary procedure of determining the factor k(V,Acc) may determine and store in advance a relationship between the vehicle speed V, the accelerator position Acc and the factor k(V,Acc) as a factor setting map and read the factor k(V,Acc) corresponding to a given vehicle speed V and a given accelerator position Acc from the map. One example of the factor setting map is shown in FIG. 5.

The HVECU 70 subsequently determines whether the temperature Tb of the battery 50 is lower than a reference value Tref (step S160). The reference value Tref used here is a lower limit temperature of a temperature range of the battery 50 that provides sufficient assistance to suppress an increase in the rotation speed Ne of the engine 22 by discharging the battery 50, and is determined according to, for example, the performance of the battery 50. The reference value Tref used may be, for example, 10° C., 15° C. or 20° C. When the temperature Tb of the battery 50 is equal to or higher than the reference value Tref, the HVECU 70 sets the output limit Wout to a specific acceleration-time output limit Woutlnr (step S170). When the temperature Tb of the battery 50 is lower than the reference value Tref, on the other hand, the HVECU 70 sets the specific acceleration-time output limit Woutlnr by subtracting an output limit. Wout (Tb) at the temperature Tb of the battery 50 from an output limit Wout(Tref) at the reference value Tref and adding this difference (Wout(Tref)−Wout(Tb)) to the output limit Wout (step S180). By taking into account that the output limit Wout is the value at the temperature Tb of the battery 50, this means that the output limit Wout at the temperature of the battery 50 equal to the reference value Tref is set to the specific acceleration-time output limit Woutlnr. Such setting of the specific acceleration-time output limit Woutlnr allows for setting of the charge-discharge required power Pb* and the target rotation speed Ne* of the engine 22 that are not allowable in the range of the output limit Wout of the battery 50 in a low temperature environment (battery temperature Tb<reference value Tref) as described later.

Figure 6:
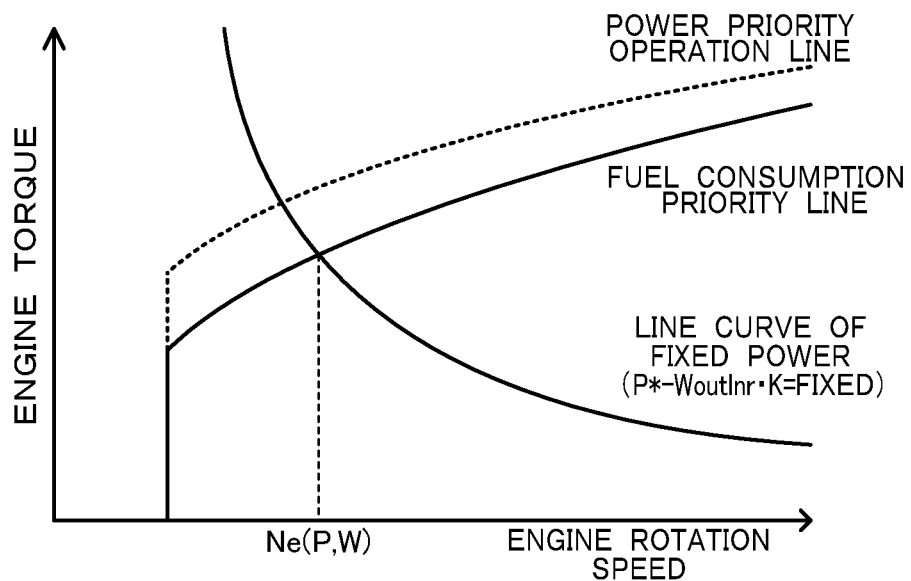
FIG. 6 is a diagram illustrating one example of a process of deriving a rotation speed Ne(P,W)

After setting the specific acceleration-time output limit Woutlnr, the HVECU 70 sets the higher between the target rotation speed Ne* of the engine 22 in the previous cycle of this routine and a rotation speed Ne(P,W) to a specific acceleration-time engine rotation speed Nelnr (step S190). The rotation speed Ne(P,W) denotes a rotation speed obtained by applying a power calculated by subtracting a product of the specific acceleration-time output limit Woutlnr and a factor K from the required power Pd* that is required for driving, to a fuel consumption priority operation line. The factor K denotes an adaptive value used to determine the degree of use of the battery 50 with a view to improving the acceleration feeling. FIG. 6 illustrates one example of a process of deriving the rotation speed Ne(P,W) by applying a curve of fixed power to a fuel consumption priority operation line expressed in a graph with the engine torque as ordinate and the engine rotation speed as abscissa. In FIG. 6, an upward-sloping solid line curve is a fuel consumption priority operation line, and an upward-sloping broken line curve is a power priority operation line. A downward-sloping solid line curve is a curve of fixed power (Pd*−Woutlnr·K). As illustrated, the rotation speed Ne(W,P) may be determined as an intersection of the fuel consumption priority operation line and the curve of fixed power (Pd*−Woutlnr·K).

Figure 7:
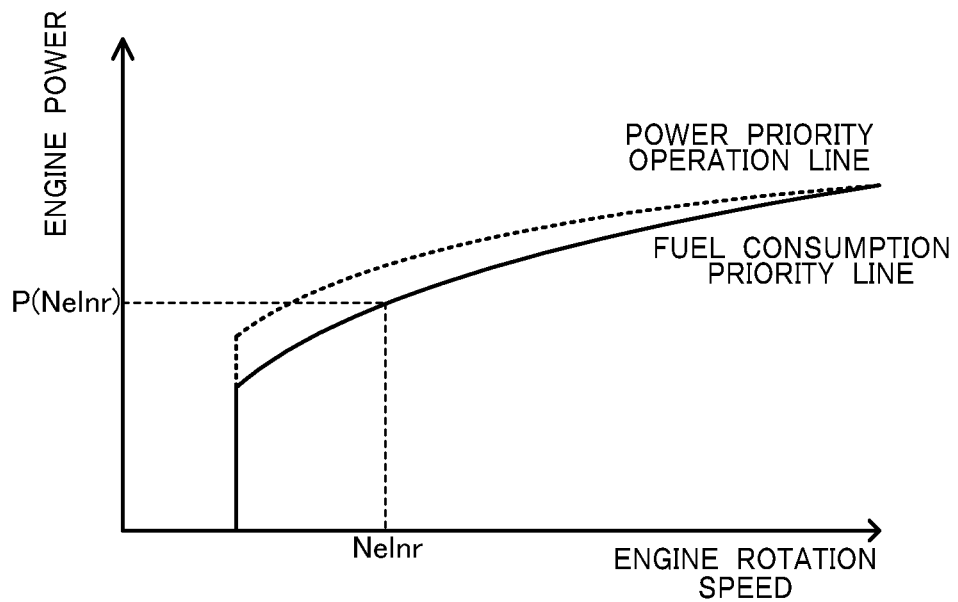
FIG. 7 is a diagram illustrating one example of a process of deriving a power P(Nelnr)

The HVECU 70 subsequently calculates a specific acceleration-time charge-discharge required base value Pblnrbs by subtracting a power P(Nelnr) from the required power Pd* (step S200). The power P(Nelnr) denotes a power obtained by applying the specific acceleration-time engine rotation speed Nelnr to a fuel consumption priority operation line. FIG. 7 illustrates one example of a process of deriving the power P(Nelnr) by applying the specific acceleration-time engine rotation speed Nelnr to a fuel consumption priority operation line expressed in a graph with the engine power as ordinate and the engine rotation speed as abscissa. In FIG. 7, an upward-sloping solid line curve is a fuel consumption priority operation line, and an upward-sloping broken line curve is a power priority operation line. As illustrated, the power P(Nelnr) may be determined by applying the rotation speed Nelnr to the fuel consumption priority operation line.

Figure 8:
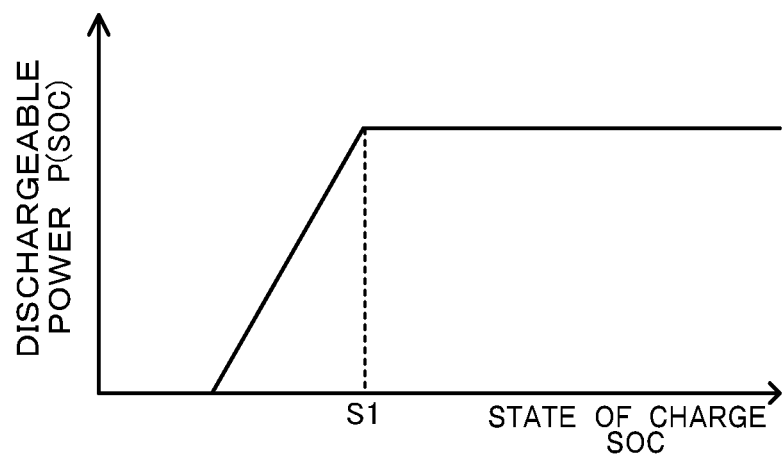
FIG. 8 is a diagram, illustrating one example of a dischargeable power setting map.

The HVECU 70 subsequently sets a specific acceleration-time charge-discharge required value Pblnr by guarding the specific acceleration-time charge-discharge required base value Pblnrbs with a dischargeable power P(SOC) that is on the basis of the state of charge SOC, as an upper limit (step S210). The dischargeable power P(SOC) denotes a maximum dischargeable power from the battery 50 having the state of charge SOC. An exemplary procedure of obtaining the dischargeable power P(SOC) may determine and store in advance a relationship between the state of charge SOC and the dischargeable power P(SOC) as a dischargeable power setting map and read the dischargeable power P(SOC) corresponding to a given state of charge SOC from this map. One example of the dischargeable power setting map is shown in FIG. 8. In the illustrated dischargeable power setting map, the dischargeable power P(SOC) reaches a fixed value at the state of charge SOC equal to or higher than a ratio S1 and decreases at the state of charge SOC of lower than the ratio S1. The ratio S1 used here may be a slightly lower ratio than the target state of charge SOC* as the center of control and may be, for example, 40%, 45% or 50%. A concrete procedure of setting the specific acceleration-time charge-discharge required value Pblnr sets the smaller between the specific acceleration-time charge-discharge required base value Pblnrbs and the dischargeable power P(SOC) to the specific acceleration-time charge-discharge required value Pblnr. The HVECU 70 sets the set specific acceleration-time charge-discharge required value Pblnr to the charge-discharge required power Pb* (step S220) and then terminates this routine.

As described above, in the non-specific acceleration time, the charge-discharge required power calculation routine of FIG. 2 basically sets the charge-discharge required base value Pbreqbs to the charge-discharge required power Pb* by using, for example, the auxiliary machinery power Pb and the power Psoc required to make the state of charge SOC of the battery 50 approach the target state of charge SOC*. In the specific acceleration time, on the other hand, the charge-discharge required power calculation routine sets the specific acceleration-time charge-discharge required power Pblnr, which is obtained by guarding the power to be output from the battery 50 with a view to suppressing an increase in the rotation speed Ne of the engine 22 within the range of the specific acceleration-time output limit Woutlnr that is set on the basis of the temperature Tb of the battery 50, with the dischargeable power P(SOC) as the upper limit, to the charge-discharge required power Pb*. The specific acceleration-time output limit Woutlnr used here is the output limit Wout of the battery 50 when the temperature Tb of the battery 50 is equal to or higher than the reference value Tref, while being the output limit Wout at the temperature of the battery 50 equal to the reference value Tref when the temperature Tb of the battery 50 is lower than the reference value Tref. Accordingly, when the temperature Tb of the battery 50 is lower than the reference value Tref, the charge-discharge required power Pb* is set, such that an intrinsically unallowable level of power is to be output from the battery 50. Setting the target rotation speed Ne* of the engine 22 using this charge-discharge required power Pb* suppresses an increase in the rotation speed Ne of the engine 22 as described below.

The following describes setting the target rotation speed Ne* of the engine 22 by referring to the engine target value calculation routine of FIG. 3. When the engine target value calculation routine is triggered, the HVECU 70 first calculates an engine required power Pe* that is to be output from the engine 22 by subtracting a product of the charge-discharge required power Pb* and an efficiency η from the required power Pd*, which the driver requires for driving, and further adding a power Pac required for air conditioning (air conditioning equipment in the passenger compartment) (step S300). The power Pac includes not only power consumption of the air conditioning equipment but the output power of the DC/DC converter. The power Pac used may be an actual measured value or may be a fixed value determined by experiment or otherwise.

The HVECU 70 subsequently determines whether the specific acceleration-time flag Facc is set to the value 1 and whether the state of charge SOC is lower than a reference value Sref (step S310). The reference value Sref denotes a criterion value used to determine whether the hybrid vehicle 20 is in a hill-climbing drive or in an active drive having the state of charge SOC kept at a relatively low level, and may be set to a medium ratio, for example, 40% or 50%.

Figure 9:
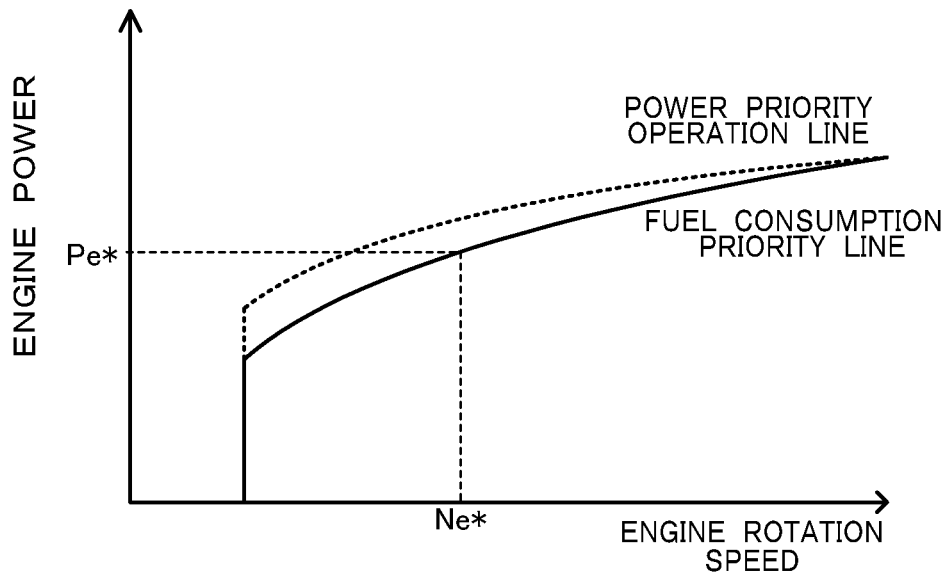
FIG. 9 is a diagram illustrating one example of a process of deriving a target rotation speed Ne*.

When it is determined at step S310 that the specific acceleration-time flag Facc is set to the value 0 or when it is determined at step S310 that the specific acceleration-time flag Facc is set to the value 1 but that the state of charge SOC is equal to or higher than the reference value Sref, the HVECU 70 sets the target rotation speed Ne* and the target torque Te* of the engine 22 by applying the engine required power Pe* to a fuel consumption priority operation line (steps S320 and S330) and then terminates this routine. FIG. 9 illustrates one example of a process of deriving the target rotation speed Ne* by applying the engine required power Pe* to a fuel consumption priority operation line expressed in a graph with the engine power as ordinate and the engine rotation speed as abscissa. The target torque Te* may be obtained by applying the target rotation speed Ne* to the fuel consumption priority operation line of FIG. 6 expressed in the graph with the engine torque as ordinate and the engine rotation speed as abscissa. After setting the target rotation speed Ne* of the engine 22, the HVECU 70 sets the torque command Tm1* of the motor MG1, such that the rotation speed Ne of the engine 22 becomes equal to the target rotation speed Ne*, and sets the value (Td*−Ted) obtained by subtracting the directly transmitted torque Ted of the engine 22 from the required torque Td*, to the torque command Tm2* of the motor MG2, as described above. The HVECU 70 then sends the target rotation speed Ne* and the target torque Te* to the engine ECU 24, while sending the torque commands Tm1* and Tm2* to the motor ECU 40. The engine ECU 24 performs, for example, intake air flow control, fuel injection control and ignition control, such that the target torque Te* is output from the engine 22, i.e., such, that the engine 22 is operated at an operation point (Ne*, Te*) on the fuel consumption priority operation line. The motor ECU 40 performs switching control of the transistors included in the respective inverters 41 and 42, such that the motors MG1 and MG2 are driven with the torque commands Tm1* and Tm2*. When the specific acceleration-time flag Facc is set to the value 1 (i.e., in the specific acceleration time), in the charge-discharge required power calculation routine of FIG. 2 described above, the specific acceleration-time charge-discharge required value Pblnr obtained by guarding the power to be output from the battery 50 with a view to suppressing an increase in the rotation speed Ne of the engine 22 within the range of the specific acceleration-time output limit Woutlnr that is set on the basis of the temperature Tb of the battery 50, with the dischargeable power P(SOC) as the upper limit is set to the charge-discharge required power Pb*. In this case, a discharging power (power of a positive value) is set to the charge-discharge required power Pb*. The power output from the engine 22 that is driven at an operation point of the target rotation speed Ne* and the target torque Te* (operation point on the fuel consumption, priority operation line) fails to cover the required power Pd*, and a power corresponding to this deficiency is output from the battery 50. This control accordingly enables the hybrid vehicle 20 to be driven with the required power Pd*, while giving the driver the good acceleration feeling with taking into account the fuel consumption, in response to the driver's acceleration request.

Figure 10:
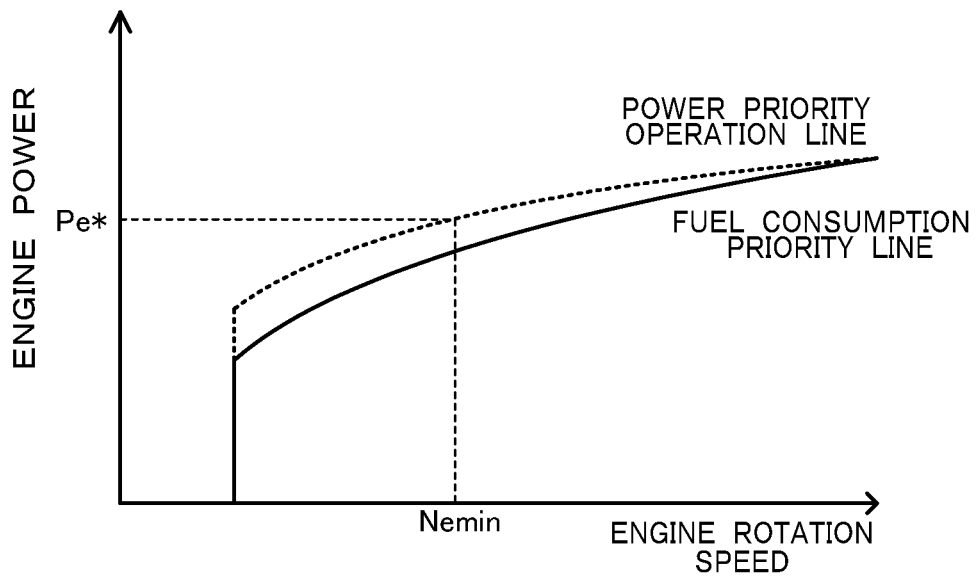
FIG. 10 is a diagram illustrating one example of a process of deriving an available minimum engine rotation speed Nemin serving as an upper limit guard value.

When it is determined at step S310 that the specific acceleration-time flag Facc is set to the value 1 and the state of charge SOC is lower than the reference value Sref, on the other hand, the HVECU 70 sets an available minimum engine rotation speed Nemin serving as an upper limit guard value by applying the engine required power Pe* to a power priority operation line (step S340). FIG. 10 illustrates one example of a process of deriving the available minimum engine rotation speed Nemin by applying the engine required power Pe* to a power priority operation line expressed in a graph with the engine power as ordinate and the engine rotation speed as abscissa. The HVECU 70 subsequently sets the target rotation speed Ne* of the engine 22 by guarding the specific acceleration-time engine rotation speed Nelnr with the available minimum engine rotation speed Hemin as an upper limit (step S350). More specifically, the HVECU 70 sets the smaller between the specific acceleration-time engine rotation speed Nelnr and the available minimum engine rotation speed Nemin to the target, rotation speed Ne* of the engine 22. The HVECU 70 sets the target torque Te* by applying the set target rotation speed Ne* to the power priority operation line (step S360) and then terminates this routine. The target torque Te* may be obtained by applying the target rotation speed Ne* to the power priority operation line of FIG. 6 expressed in the graph with the engine torque as ordinate and the engine rotation speed as abscissa. After setting the target rotation speed Ne* of the engine 22, the HVECU 70 sets the torque command Tm1* of the motor MG1, such that the rotation speed Ne of the engine 22 becomes equal to the target rotation speed Ne*, and sets the value (Td*−Ted) obtained by subtracting the directly transmitted torque Ted of the engine 22 from the required torque Td*, to the torque command Tm2* of the motor MG2, as described above. The HVECU 70 then sends the target rotation speed Ne* and the target torque Te* to the engine ECU 24, while sending the torque commands Tm1* and Tm2* to the motor ECU 40. The engine ECU 24 performs, for example, intake air flow control, fuel injection control and ignition control, such that the target torque Te* is output from the engine 22, i.e., such that the engine 22 is operated at an operation point (Ne*, Te*) on the power priority operation line. The motor ECU 40 performs switching control of the transistors included in the respective inverters 41 and 42, such that the motors MG1 and MG2 are driven with the torque commands Tm1* and Tm2*. When the specific acceleration-time flag Facc is set to the value 1 (i.e., in the specific acceleration time), the charge-discharge required power Pb* is set to the discharge power (power of a positive value), such as to suppress an increase in the rotation speed Ne of the engine 22 in the range of the specific acceleration-time output limit Woutlnr that is set on the basis of the temperature Tb of the battery 50, as described above. The engine 22 is, however, operated on the power priority operation line. This reduces a deficiency of the power output from the engine 22 to cover the required power Pd* and thereby reduces a power to be output from the battery 50 corresponding to this deficiency. This control accordingly enables the hybrid vehicle 20 to be driven with the required power Pd*, while giving the driver the good acceleration feeling with suppressing a decrease in the state of charge SOC of the battery 50, in response to the driver's acceleration request.

As described above, when the state of charge SOC of the battery 50 is equal to or higher than the reference value Sref in the specific acceleration time where the driver steps down the accelerator pedal 83, the hybrid vehicle 20 of the embodiment basically sets the power to be output from the battery 50 with a view to suppressing an increase in the rotation speed Ne of the engine 22 within the range of the specific acceleration-time output limit Woutlnr that is set on the basis of the temperature Tb of the battery 50, to the charge-discharge required power Pb*. The hybrid vehicle 20 of the embodiment then controls the engine 22 and the motors MG1 and MG2, such that the engine required power Pe* obtained by subtracting the charge-discharge required power Pb* from the required power Pd* that is required for driving is output from the engine 22 at an operation point on the fuel consumption priority operation line and that a deficiency of the engine required power Pe* to cover the required power Pd* is output from the battery 50. This enables the hybrid vehicle 20 to be driven with the required power Pd*, while giving the driver the good acceleration feeling with taking into account the fuel consumption, in response to the driver's acceleration request. When the state of charge SOC of the battery 50 is lower than the reference value Sref in the specific acceleration time, on the other hand, the hybrid vehicle 20 of the embodiment sets the charge-discharge required power Pb* in the same manner as that when the state of charge SOC of the battery 50 is equal to or higher than the reference value Sref. The hybrid vehicle 20 of the embodiment then controls the engine 22 and the motors MG1 and MG2, such that the engine required power Pe* obtained by subtracting the charge-discharge required power Pb* from the required power Pd* that is required for driving is output from the engine 22 at an operation point on the power priority operation line and that a deficiency of the engine required power Pe* to cover the required power Pd* is output from the battery 50. This enables the hybrid vehicle 20 to be driven with the required power Pd*, while giving the driver the good acceleration feeling with suppressing a decrease in the state of charge SOC of the battery 50, in response to the driver's acceleration request.

When the temperature Tb of the battery 50 is lower than the reference value Tref in the specific acceleration time, the hybrid vehicle 20 of the embodiment sets the specific acceleration-time output limit Woutlnr by subtracting the output limit Wout (Tb) at the temperature Tb of the battery 50 from the output limit Wout(Tref) at the reference value Tref and adding this difference (Wout(Tref)−Wout (Tb)) to the output limit Wout and selects whether the fuel consumption priority operation line is to be used or the power priority operation line is to be used, based on determination of whether the state of charge SOC of the battery 50 is lower than the reference value Sref. According to a modification, however, when the temperature Tb of the battery 50 is lower than the reference value Tref in the specific acceleration time, the power priority operation line may be used irrespective of the state of charge SOC of the battery 50. This provides the driver the better acceleration, feeling even when the temperature Tb of the battery 50 is lower than the reference value Tref.

The hybrid vehicle 20 of the embodiment is equipped with the motor MG1 and the planetary gear 30. According to a modification, the hybrid vehicle may be equipped with a mechanical continuously variable transmission, in place of the motor MG1 and the planetary gear 30.

The hybrid, vehicle 20 of the embodiment uses the battery 50 as the power storage device. The power storage device used may, however, be any device that is capable of accumulating electricity, such as a capacitor.

The hybrid vehicle 20 of the embodiment is equipped with the step-up/down converter 55. According to a modification, the hybrid vehicle may be configured without the step-up/down converter 55.

The hybrid vehicle 20 of the embodiment is provided with the engine ECU 24, the motor ECU 40, the battery ECU 52 and the HVECU 70. According to a modification, at least two of them may be configured as one single electronic control unit.

In the hybrid vehicle of the above aspect, when the state of charge of the power storage device is equal to or higher than the predetermined ratio in the specific acceleration time and temperature of the power storage device is lower than a predetermined temperature, the control device may control the engine and the continuously variable transmission, such that the rotation speed of the engine is not increased in the range of the output limit of the power storage device and that the engine is operated at an operation point on the power priority operation line, and control the motor, such that the hybrid vehicle is driven with the required power. This configuration provides the driver the good acceleration feeling even when the power storage device has a low temperature.

In the hybrid vehicle of the above aspect, the control device may control the engine to be operated at a higher rotation speed between a current rotation speed of the engine and a rotation speed obtained by applying a power calculated by subtracting the output limit of the power storage device from the required power to a working operation line currently used out of the fuel consumption priority operation line and the power priority operation line. This configuration suppresses a decrease in the rotation speed of the engine and thereby suppresses a feeling of strangeness from being provided to the driver due to a decrease in rotation speed of the engine in the specific acceleration time.

In the hybrid vehicle of the above aspect, the continuously variable transmission may include a generator configured to input and output power, and a planetary gear mechanism configured such that three rotational elements are respectively connected with three shafts that are a rotating shaft of the generator, the output shaft of the engine and the driveshaft and the generator may be electrically connected with the power storage device and with the motor to transmit electric power to and from the power storage device and the motor.

The following describes the correspondence relationship between the primary elements of the above embodiment and the primary elements of the disclosure described in Summary. The engine 22 of the embodiment corresponds to the "engine", the motor MG1 and planetary gear 30 correspond to the "continuously variable transmission", the motor MG2 corresponds to the "motor", the battery 50 corresponds the "power storage device", and the HVECU 70, the engine ECU 24, the motor ECU 40 and the battery ECU 52 correspond to the "control device".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The disclosure is applicable to, for example, the manufacturing industries of hybrid vehicles.

The invention claimed is:
1. A hybrid vehicle, comprising:
an engine;
a continuously variable transmission connected with an output shaft of the engine and with a driveshaft that is coupled with an axle;
a motor configured to input and output power for driving;
a power storage device configured to transmit electric power to and from the motor; and
a control device configured to control the engine, the continuously variable transmission and the motor, such that the hybrid vehicle is driven with a required power that is required for driving with suppressing a rotation speed of the engine within a range of an output limit of the power storage device, in a specific acceleration time where an acceleration request is equal to or greater than a predetermined level, wherein when a state of charge of the power storage device is equal to or higher than a predetermined ratio in the specific acceleration time, the control device controls the engine and the continuously variable transmission, such that the rotation speed of the engine is not increased in the range of the output limit of the power storage device and that the engine is operated at an operation point on a fuel consumption priority operation line that is determined in advance as an operation line giving priority to fuel consumption of the engine, and controls the motor, such that the hybrid vehicle is driven with the required power, and when the state of charge of the power storage device is lower than the predetermined ratio in the specific acceleration time, the control device controls the engine and the continuously variable transmission, such that the rotation speed of the engine is not increased in the range of the output limit of the power storage device and that the engine is operated at an operation point on a power priority operation line that is determined in advance as am operation line outputting a higher power at an identical rotation speed compared with the fuel consumption priority operation line, and controls the motor, such that, the hybrid vehicle is driven with the required power.

2. The hybrid vehicle according to claim 1,
wherein when the state of charge of the power storage device is equal to or higher than the predetermined ratio in the specific acceleration time and temperature of the power storage device is lower than a predetermined temperature, the control device controls the engine and the continuously variable transmission, such that the rotation speed of the engine is not increased in the range of the output limit of the power storage device and that the engine is operated at an operation point on the power priority operation line, and controls the motor, such that the hybrid vehicle is driven with the required power.

3. The hybrid vehicle according to claim 1,
wherein the control device controls the engine to be operated at a higher rotation speed between a current rotation speed of the engine and a rotation speed obtained by applying a power calculated by subtracting the output limit of the power storage device from the required power to a working operation line currently used out of the fuel consumption priority operation line and the power priority operation line.

4. The hybrid vehicle according to claim 1,
wherein the continuously variable transmission comprises a generator configured to input and output power, and a planetary gear mechanism configured such that three rotational elements are respectively connected with three shafts that are a rotating shaft of the generator, the output shaft of the engine and the driveshaft, and
the generator is electrically connected with the power storage device and with the motor to transmit electric power to and from the power storage device and the motor.

5. The hybrid vehicle according to claim 2,
wherein the control device controls the engine to be operated at a higher rotation speed between a current rotation speed of the engine and a rotation speed obtained by applying a power calculated by subtracting the output limit of the power storage device from the required power to a working operation line currently used out of the fuel consumption priority operation line and the power priority operation line.

6. The hybrid vehicle according to claim 2,
wherein the continuously variable transmission comprises
   a generator configured to input and output power, and
   a planetary gear mechanism configured such that three rotational elements are respectively connected with three shafts that are a rotating shaft of the generator, the output shaft of the engine and the driveshaft, and
the generator is electrically connected with the power storage device and with the motor to transmit electric power to and from the power storage device and the motor.

7. The hybrid vehicle according to claim 3,
wherein the continuously variable transmission comprises
   a generator configured to input and output power, and
   a planetary gear mechanism configured such that three rotational elements are respectively connected with three shafts that are a rotating shaft of the generator, the output shaft of the engine and the driveshaft, and
the generator is electrically connected with the power storage device and with the motor to transmit electric power to and from the power storage device and the motor.

* * * * *

UNITED STATES PATENT AND TRADEMARK OFFICE
CERTIFICATE OF CORRECTION

PATENT NO. : 10,919,516 B2
APPLICATION NO. : 16/214514
DATED : February 16, 2021
INVENTOR(S) : Hideki Kamatani It is certified that error appears in the above-identified patent and that said Letters Patent is hereby corrected as shown below:

In the Specification

In Column 3, Line(s) 29, after "diagram", delete ",".

In Column 5, Line(s) 15, after "connected", delete ",".

In Column 5, Line(s) 17, delete "ECO" and insert --ECU--, therefor.

In Column 6, Line(s) 50, delete "Tm2/\*" and insert --Tm2\*--, therefor.

In Column 8, Line(s) 50, delete "seta" and insert --sets--, therefor.

In Column 9, Line(s) 41, after "limit", delete ".".

In Column 12, Line(s) 12, after "such", delete ",".

In Column 12, Line(s) 34, after "consumption", delete ",".

In Column 12, Line(s) 59, after "target", delete ",".

In Column 14, Line(s) 25, after "acceleration", delete ",".

In Column 14, Line(s) 33, after "hybrid", delete ",".

In the Claims

In Column 16, Line(s) 21, Claim 1, delete "am" and insert --an--, therefor.

In Column 16, Line(s) 24, Claim 1, after "such that", delete ",".

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*